Patented Sept. 19, 1950

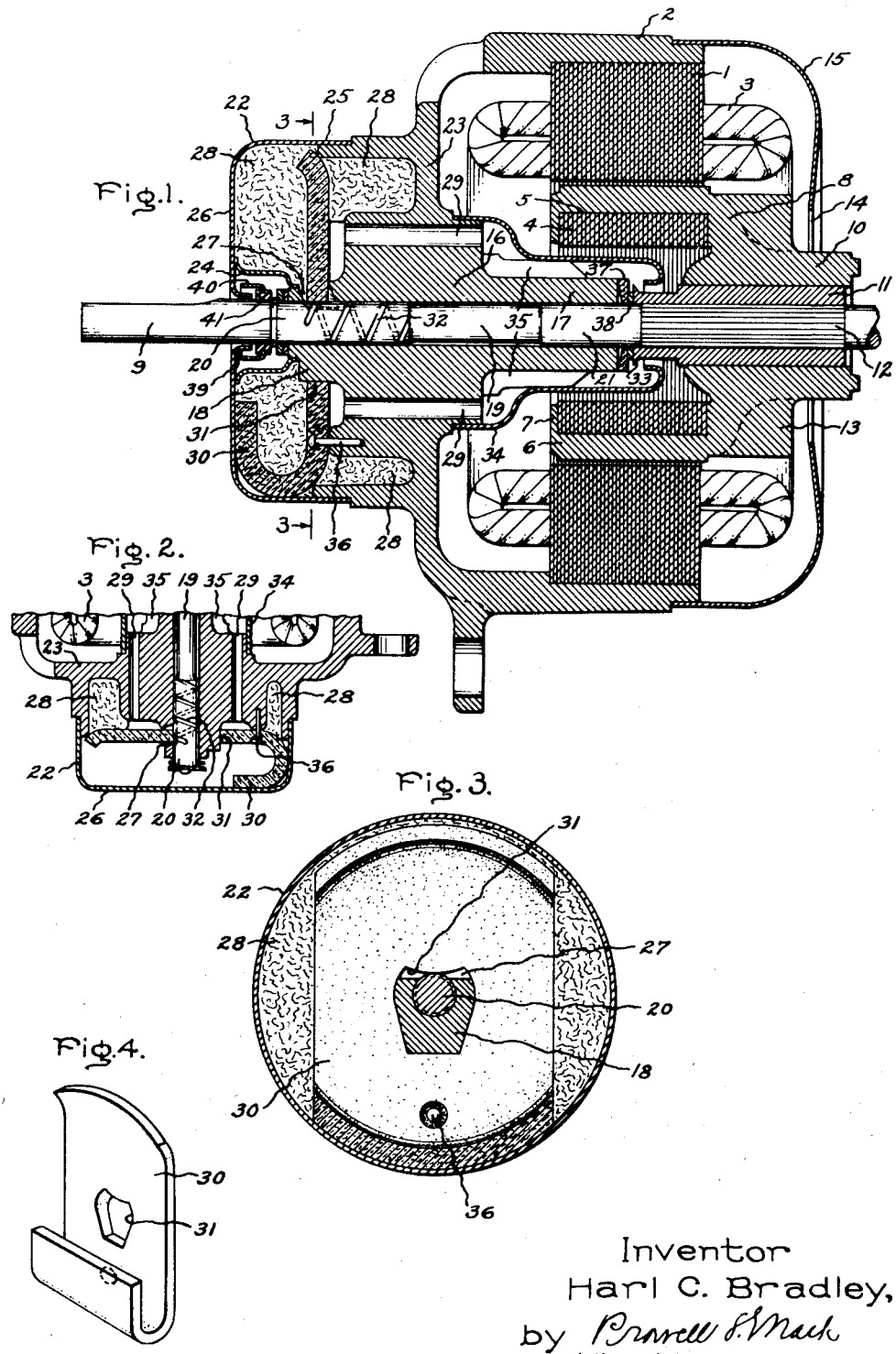

2,522,985

UNITED STATES PATENT OFFICE 2,522,985

SUPPORTING STRUCTURE FOR MACHINES

Harl C. Bradley, Fort Wayne, Ind., assignor to General Electric Company, a corporation of New York Application December 29, 1945, Serial No. 637,917

3 Claims. (Cl. 308—132)

My invention relates to an improved supporting and bearing construction for machines.

An object of my invention is to provide an improved unit bearing for supporting the rotatable member of a machine.

Another object of my invention is to provide an improved bearing and lubricating arrangement for a machine having a unit supporting bearing.

A further object of my invention is to provide an improved lubricating and sealing construction for a supporting bearing for a rotatable member of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional side elevational view of a dynamoelectric machine including an embodiment of my invention; Fig. 2 is a fragmentary elevational view, partly in section of the lubricant reservoir and feed for a vertical shaft motor of the type shown in Fig. 1; Fig. 3 is a sectional view taken along line 3—3 of Fig. 1; and Fig. 4 is a perspective view of the wick used in combination with my improved supporting construction.

Referring to the drawing, I have shown an embodiment of my improved supporting structure applied to a dynamoelectric machine having a stationary member provided with a laminated core 1 of magnetic material mounted in a stationary member frame or housing 2 and having an exciting winding 3 arranged in winding slots in the core 1. The machine is provided with a rotatable member having a laminated core 4 of magnetic material formed with winding slots 5 spaced circumferentially about the outer periphery thereof in which conductors 6 of a cast or fabricated squirrel cage winding are arranged. A short circuiting end ring 7 is formed over one side of the laminated core 4 and is integrally secured to the conductors 6, as by being cast or fabricated of the same material, and another short circuiting end ring 8 is electrically connected to the other end of the conductors 6 and extends over the other side of the laminated core 4, thereby providing an arrangement for retaining the laminations of the core 4 in assembled relation between the end rings 7 and 8 and the winding conductors 6. This rotatable member is adapted to be mounted on a supporting shaft 9 by the provision of a hub portion 10 cast integral with the end ring 8 and secured to a sleeve 11 which is arranged in driving engagement with a splined or knurled end 12 of the shaft 9. In order to assist in cooling the machine, the cast or fabricated squirrel cage winding is formed with impeller blade portions 13 which extend outwardly from the end ring 8 and the hub 10 and provide for the circulation of cooling fluid, such as air, over the winding 3 and through the air gap between the rotatable and stationary members of the machine. This cooling air may be drawn into the machine through a central opening 14 in a cup-shaped end shield 15 secured to the stationary member housing 2 and adapted to enclose the winding 3 and a portion of the rotatable member. With this construction, the rotatable member is supported on an overhung portion 12 of the shaft 9, and this shaft 9 is adapted to be mounted on the stationary member of the machine in a bearing including a central hub portion 16 and two sleeve portions 17 and 18 extending longitudinally on each side of the central hub portion 16. The rotatable member shaft 9 is formed with a relieved section 19 of smaller diameter than the adjacent portions 20 and 21, thereby forming a pair of bearing supporting surfaces on the shaft by the engagement of the shaft portions 20 and 21 with the cylindrical stationary bearing surfaces.

In order to provide suitable lubrication to the bearing surfaces of the shaft 9, a lubricant reservoir is formed in an end shield of the machine which extends around the outer axial end portion 18 of the bearing. This reservoir is formed by a cup-shaped end bell 22 adapted to be closed by the adjacent end of a supporting wall 23 of the stationary member frame with the joint between the cover 22 and the adjacent portion of the supporting member sealed with any suitable material, such as an alkyd resin to form an exteriorly closed lubricant reservoir having inner and outer side walls 24 and 25 and inner and outer end walls 23 and 26 with a central passage extending axially therethrough for the passage of the end shaft 9. In some instances, as in a vertical shaft motor shown in Fig. 2, the reservoir may be completely closed by the outer end wall 26. In order to supply lubricant from the lubricant reservoir to the bearing surfaces, a lubricant feeding passage 27 is formed through the upper side of the bearing portion 18 and loose lubricant absorbing material 28, such as wool, preferably substantially fills the reservoir but does not cover the ends of openings 29 and in some cases may be found to be unnecessary between the end wall 26 of the reservoir and a lubricant feeding wick 30, also of lubricant absorbing material, as shown in Fig. 2. The wick 30 is arranged within the reservoir with a central opening 31 therein extending over the bearing portion 18 and into the lubricant feeding passage 27 into contact with the shaft portion 20. Lubricant, such as any suitable oil, is placed in the reservoir and is substantially absorbed by the loose wool 28 and the wick 30, such that it is fed at a desired rate to the shaft portion 20, from which it is fed along the bearing by a spiral groove 32 formed in the shaft portion 20 and passes into the pocket formed around the relieved portion 19 of the shaft and is then fed to the bearing engaging shaft portion 21. In the construction shown in Fig. 1, any lubricating oil which passes from the end of the bearing portion 17 along the portion shaft 21 is thrown outwardly by an oil slinger ring portion 33 formed on the inner end of the sleeve 11. This slinger ring 33 forms part of a sealing arrangement for preventing the passage of lubricating oil into the motor casing, as it throws any oil which reaches this end of the shaft into an enclosing housing 34 held concentric with shaft bore by four ribs 35 on sleeve 11 machined to fit inside bores of housing 34 arranged to extend around the oil slinger 33 and the bearing sleeve portion 17 to provide an oil collection chamber arranged in communication with axially extending passages 29 which provide for the return of lubricant from this collecting chamber to the reservoir from which it may again be recirculated to the bearing surfaces. In order to assure against displacement of the wick 30 relative to the reservoir, a suitable rivet 36 secures the wick 30 to a projection formed on the central hub portion 16 of the bearing. A thrust washer 37 designed for either direction of rotation is used to carry the weight of the rotor and fan. A felt washer 38 is arranged between the thrust washer 37 and the end of the sleeve 11 to cushion end bump and minimize resultant noise. In order further to assure against the passage of lubricating oil along the shaft 9 in Fig. 1, the end bell 26 is formed with a reentrant flange portion 39 which extends axially around the shaft 9 within the inner reservoir wall 24, and a lubricant thrower formed by a cylindrical longitudinally extending element 40 is arranged between the inner side wall 24 and the reentrant flange portion 39 and is supported by a member 41 formed of any suitable lubricant-resistant resilient material, such as neoprene, and mounted on the shaft 9 with a driving fit so that the mounting member 41 and the thrower element 40 rotate with the shaft and tend to throw outwardly into the space formed between the reentrant flange 39 and the inner side wall 24 of the reservoir any lubricant which passes along the shaft from the reservoir to the thrower 40 for minimizing the passage of lubricating oil outwardly along the shaft 9. Thus, my improved motor and bearing supporting constructions provide for adequate lubrication of the bearings under normal operating conditions and prevent the escape of lubricant from the motor along the shaft in either direction.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A supporting structure for a machine having a stationary member and a rotatable member, said stationary member including a frame having a bearing, means including a shaft having a section in engagement with said bearing for supporting said rotatable member thereon, a thrust washer between said rotatable member and said bearing, means for lubricating and sealing said bearing and said thrust washer including a lubricant reservoir having inner and outer side walls and inner and outer end walls extending around a portion of said bearing with a central passage therethrough for said shaft, a lubricant feeding passage through said bearing within said reservoir, loose lubricant absorbing material substantially filling said reservoir, means including a wick of lubricant absorbing material within said reservoir in contact with said loose material and formed with a portion extending into said lubricant feeding passage for supplying lubricant to said bearing from said reservoir, said outer end wall of said reservoir being formed with a reentrant flange portion extending around said shaft inside a portion of said inner side wall, and means including a lubricant thrower extending between said reentrant flange portion and said inner side wall of said reservoir and supported by a member having a tight driving fit on said shaft for minimizing the flow of lubricant along said shaft past said thrower.

2. A supporting structure for a machine having a stationary member and a rotatable member, said stationary member including a frame having a bearing, means including a shaft having a section in engagement with said bearing for supporting said rotatable member thereon, a thrust washer between said rotatable member and said bearing, means for lubricating and sealing said bearing and said washer including an exteriorly closed lubricant reservoir adapted to contain lubricant and having inner and outer side walls and inner and outer end walls extending around the outer axial end of said bearing with a central passage therethrough for said shaft, a lubricant feeding passage through said bearing within said reservoir, loose lubricant absorbing material substantially filling said reservoir, means including a wick of lubricant absorbing material within said reservoir in contact with said loose material and formed with a portion extending into said lubricant feeding passage for supplying lubricant to said bearing, said outer end wall of said reservoir being formed with a reentrant flange portion extending around said shaft inside a portion of said inner side wall, and means including a lubricant thrower having a cylindrical portion extending between said reentrant flange portion and said inner side wall of said reservoir and supported by a lubricant resisting resilient material member having a tight driving fit on said shaft for minimizing the flow of lubricant along said shaft past said thrower.

3. A unit bearing dynamoelectric machine having an outer stator member and an inner rotor member concentrically arranged therein, a stationary frame member having an outer portion for supporting said stator member and an annular wall portion, a bearing having a central hub portion supported by said wall, a shaft rotatably seated in said bearing and extending on both sides thereof, said rotor member having a cavity formed therein on the side of said rotor toward said bearing, said rotor member having a hub portion secured to the shaft extension on the rotor side of said bearing and extending into said rotor cavity, said bearing having an extension portion extending from said central hub portion toward said rotor hub portion and into said rotor cavity, said bearing extension and said rotor hub portion forming a thrust bearing, an annular housing member secured to said bearing hub portion and extending into said rotor cavity surrounding said bearing extension and spaced therefrom, said housing member having a re-entrant flange portion surrounding said rotor hub portion, a lubricant reservoir secured to the side of said wall remote from said rotor and surrounding said bearing hub and the other of said shaft extensions, a lubricant return opening through said bearing hub communicating with said reservoir and the space between said housing member and said bearing extension, loose lubricant absorbent material positioned in said reservoir, a wick of lubricant absorbent material arranged in said reservoir and contacting said other shaft extension for feeding lubricant to said bearing from said reservoir, the journal surface of said shaft having lubricant pumping grooves formed thereon for pumping lubricant through said bearing from said wick toward said rotor member, and lubricant throwing means adjacent the end of said bearing extension for throwing lubricant which has been pumped through said bearing into said housing member for return to said reservoir through said space between said housing member and said bearing extension and said lubricant return opening.

HARL C. BRADLEY.

REFERENCES CITED

The following references are of record in the file of this patent:

UNITED STATES PATENTS

| Number | Name | Date |
| --- | --- | --- |
| 2,053,425 | Else | Sept. 8, 1936 |
| 2,306,743 | Morrill | Dec. 29, 1942 |